United States Patent
Kuo

(10) Patent No.: US 7,302,746 B2
(45) Date of Patent: Dec. 4, 2007

(54) COLDWORK HOLES WITH ROTATING MANDREL AND METHOD

(75) Inventor: Albert S. Kuo, Chesterfield, MO (US)

(73) Assignee: Albert Kuo, Chesterfield, MO (US)

( * ) Notice: Subject to any disclaimer, the term of this patent is extended or adjusted under 35 U.S.C. 154(b) by 201 days.

(21) Appl. No.: 11/000,284

(22) Filed: Nov. 30, 2004

(65) Prior Publication Data

US 2006/0112533 A1    Jun. 1, 2006

(51) Int. Cl.
   B23P 11/02        (2006.01)
   B23P 11/00        (2006.01)
   B21D 39/08        (2006.01)
(52) U.S. Cl. ............... 29/446; 29/243.517; 72/370.07
(58) Field of Classification Search ............... 29/446, 29/509, 243.518, 243.517, 523, 523.02; 403/408.1; 411/501; 72/370.07, 122
   See application file for complete search history.

(56) References Cited

U.S. PATENT DOCUMENTS

| | | | |
|---|---|---|---|
| 2,405,399 A * | 8/1946 | Bugg et al. ............. | 29/243.518 |
| 2,854,058 A * | 9/1958 | Baker ..................... | 72/122 |
| 3,566,662 A | 3/1971 | Champoux | |
| 3,895,922 A | 7/1975 | Phillips | |
| 3,943,748 A | 3/1976 | King, Jr. | |
| 3,951,561 A | 4/1976 | Speakman | |
| 4,164,807 A | 8/1979 | King, Jr. | |
| 4,423,619 A | 1/1984 | Champoux | |
| 4,433,567 A | 2/1984 | Mead | |
| 4,665,732 A | 5/1987 | Hogenhout | |
| 4,956,991 A | 9/1990 | Noonan | |
| 5,127,254 A | 7/1992 | Copple | |
| 5,943,898 A | 8/1999 | Kuo | |
| 6,230,537 B1 | 5/2001 | Eastbrook | |
| 6,266,991 B1 | 7/2001 | Kuo | |

OTHER PUBLICATIONS

C.M. Wayman, Shape Memory Alloys, Material Research Society Bulletin, vol. 18, No. 4, Apr. 1993.

* cited by examiner

*Primary Examiner*—John C. Hong
(74) *Attorney, Agent, or Firm*—Schwegman, Lundberg & Woessner, P.A.

(57) ABSTRACT

A method and apparatus for coldworking holes using rotational mandrel. The apparatus uses a tubular seamless sleeve made of shape memory alloys having a superelasticity property, a mandrel having major and minor diameter portions, an end-cap to seat and restrain axial and rotational motion of said sleeve. The preferred coldworking operation includes the steps of placing the sleeve firmly between the end-cap and the adapting-spacer which are carried on a mandrel pulling means, passing forward the major diameter portion of the mandrel through the sleeve whose diameter is therefore elastically expanded and thereafter shrinks, inserting the sleeve together with the mandrel into said hole, placing the end-cap against the workpiece, retracting while rotating the mandrel backward through and out of the sleeve; thereby expanding the sleeve wall against the hole bore and exerting radial outward force on the sleeve which in turn transmits the coldworking force to the hole bore and plastically expand said hole; thereafter the sleeve diameter shrinking to a smaller size to ease the removal of the sleeve out of the hole. The sleeve is reusable due to the superelasticity property of shape memory alloys.

15 Claims, 2 Drawing Sheets

COLDWORK HOLES WITH ROTATING MANDREL AND METHOD

BACKGROUND OF THE INVENTION

The fatigue lives of holes in structures and machinery made of metallic materials can be enhanced by a hole coldworking method which imparts a beneficial compressive residual stress around hole edges. Such a method is especially useful in the manufacturing of airframe structures. Several prior art methods are available to enhance the fatigue lives of holes, for example, split sleeve method described in U.S. Pat. No. 3,566,662, seamless sleeve method described in U.S. Pat. No. 4,164,807, stress coining method described in U.S. Pat. No. 3,895,922, split mandrel method described in U.S. Pat. No. 4,665,732, stress wave method described in U.S. Pat. No. 6,230,537 B1, shape memory effect sleeve method described in U.S. Pat. No. 4,433,567, and my invention described in U.S. Pat. No. 5,943,898 which utilizes a tubular seamless sleeve made of shape memory alloy having a superelasticity property. The disadvantages of the prior art of hole coldworking methods including split sleeve, split mandrel, stress coining, and seamless sleeve were discussed in my previous invention of U.S. Pat. No. 5,943,898. The split sleeve method is the common method currently used in the aerospace industry. The disadvantages of the prior art of split sleeve and split mandrel methods are associated with the creation of a ridge and shear discontinuity in the bore of a coldworked hole. The prior art of shape memory effect sleeve method requires to cool down a sleeve to cryogenic temperatures; therefore the method is impractical for the application to productions. The disadvantage of the prior art of stress wave method is that it requires two-sided operation and that it is difficult to coldwork the middle part in a stack of parts of an assembly. All of the aforementioned disadvantages of the prior art of coldworking methods were eliminated by my previous inventions of U.S. Pat. Nos. 5,943,898 and 6,266,991 B1, which utilizes a tubular seamless sleeve made of shape memory alloys having a superelasticity property. However, shape memory alloys are more costly than other metals for airframe structures. Additionally, seamless sleeves made of shape memory alloys are prone to being damaged after repeated use. It will be advantageous to prolong the reuseablity of the seamless sleeves made of shape memory alloys, thereby reducing manufacturing cost and facilitating manufacturing automation.

SUMMARY OF THE INVENTION

The present invention described herein is an improvement of my previous inventions of U.S. Pat. Nos. 5,943,898 and 6,266,991 B1. The improvement makes the seamless sleeve made of shape memory alloys more durable to prolong its reusability, thereby reducing manufacturing costs and facilitating manufacturing automation.

A coldworking method and apparatus utilizing a rotating mandrel and a tubular seamless reusable sleeve made of shape memory alloys (abbreviated hereinafter as SMA in this document) having a superelasticity property has been invented and is described hereinafter to enhance the fatigue lives of holes. The tubular seamless SMA sleeve coldworking method eliminates the final reaming step of the prior art of split sleeve and split mandrel coldworking methods described in U.S. Pat. Nos. 3,566,662 and 4,665,732. The rotating mandrel enhances the reusability of the seamless SMA sleeve. In contrast to the prior art of seamless sleeve coldworking method described in U.S. Pat. No. 4,164,807, the diameter of the seamless SMA sleeve shrinks after hole expansion, owing to the superelasticity property of SMA, to a size amicable to the removal of the seamless SMA sleeve. Hence the present invention not only shortens manufacturing time to reduce labor cost and creates higher beneficial compressive residual stress at hole edge than the split sleeve and split mandrel method, but also reduces material cost via the prolonged reusability of the sleeves, which in turn facilitates manufacturing automation.

In general, the method of coldworking holes of this invention comprises the steps of assembling a pre-lubricated tubular seamless sleeve made of SMA having a superelasticity property and the associated parts to the coldworking mandrel pulling means, securing firmly said sleeve in the mandrel pulling means, pushing the mandrel forward through the sleeve, inserting the mandrel and sleeve into a hole to be coldworked in an associated workpiece, holding the sleeve in the hole while rotating and retracting backward the mandrel from the workpiece, thereby expanding the sleeve to contact with hole wall and thereby compressing the materials of the sleeve and the hole in a radial direction taken from the center axis of the hole, and removing the sleeve, whose diameter shrinks to a size amicable to the removal of said sleeve out of the coldworked hole. The apparatus uses a pre-lubricated tubular seamless sleeve made of SMA having a superelasticity property, a mandrel having a major and a minor diameter portion, an end-cap, and a means to enable the axial and rotational motion of said mandrel.

It is therefore an object of the present invention to provide a hole coldworking method which eliminates the need for the final reaming of holes, thereby shortening manufacturing time and reducing labor cost, and thereby improving the fatigue life of holes when compared to the prior art methods of coldworking using a mandrel.

It is a further object of the present invention to prolong the reusability of the costly seamless SMA sleeve to save material cost, to reduce operation down-time, and to thereby become suitable for use in manufacturing automation, which requires reduced labor costs and consistent quality.

DESCRIPTION OF THE FIGURES

Further objects and advantages of the present invention will become apparent from the following description taken in conjunction with the accompanying drawings, which are illustrated in cross sectional views for explanatory purpose.

DETAILED DESCRIPTION OF THE INVENTION

Figure 1:
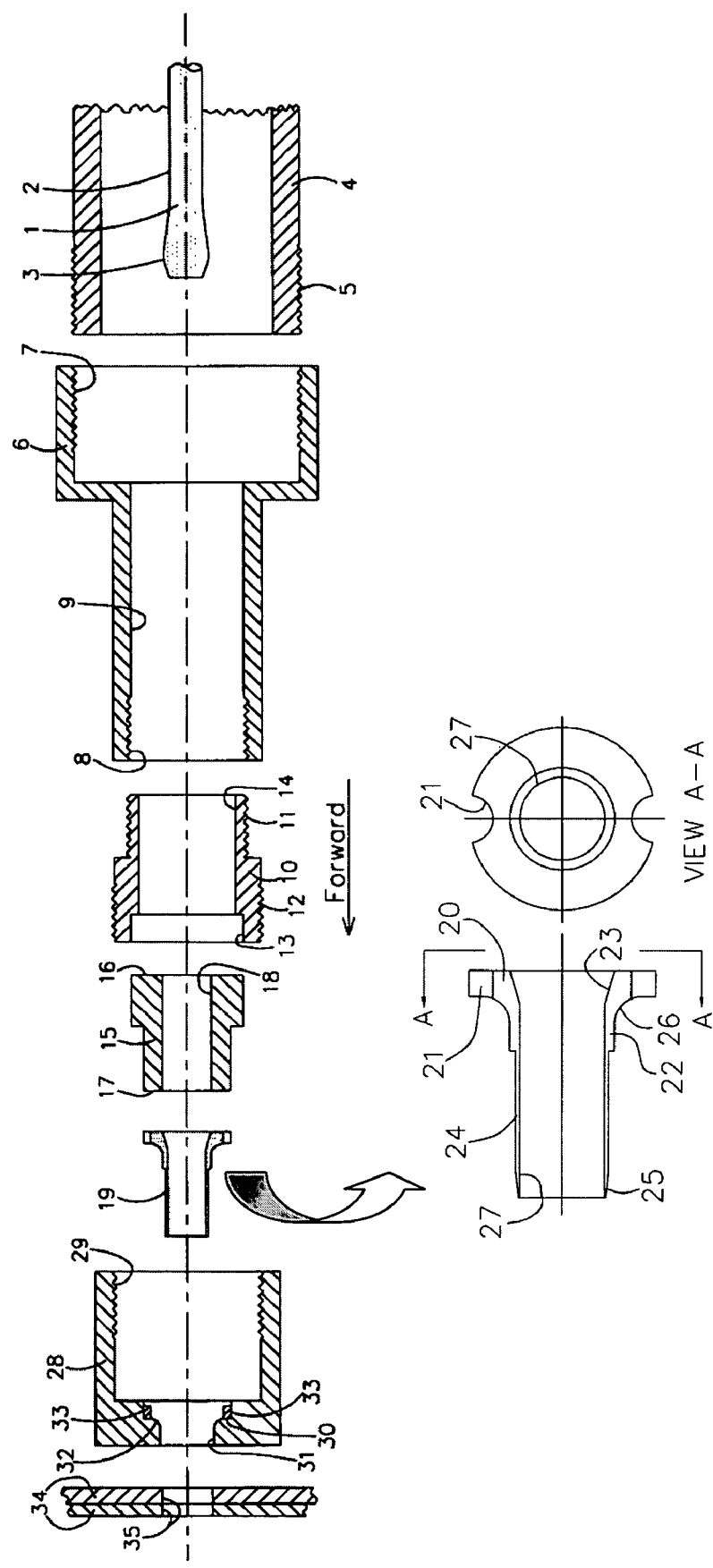
FIG. 1 is a cross sectional view of the parts of the present invention, the forward end of the cylinder of a mandrel pulling means in which the invention is carried, and the workpiece. Also shown in FIG. 1 is a cross sectional view of the improved design of the tubular seamless SMA sleeve.

When considering the most essential steps of this invention to improve the prior art of coldworking methods, especially my previous inventions of U.S. Pat. Nos. 5,943,898 and 6,266,991 B1, references should be made to FIGS. 1 through 5.

The present invention of hole coldworking utilizes a tubular seamless sleeve made of shape memory alloys which has a superelasticity property. The superelasticity property of SMA is described in C. M. Wayman's article entitled "Shape Memory Alloys" which was published in Materials Research Society Bulletin, Volume 18, Number 4, April 1993. Shape memory alloys are characterized by two effects, namely the shape memory effect and the superelasticity effect. The prior art of U.S. Pat. No. 4,433,567 utilized the shape memory effect, which requires a substantial change of the temperature of a sleeve during the hole coldworking operation. This invention and my previous inventions of U.S. Pat. Nos. 5,943,898 and 6,266,991 B1 utilize the superelasticity effect, which is effective at ambient temperatures of manufacturing shops during the coldworking operation and does not require an intentional change of temperature. To demonstrate how tubular seamless SMA sleeves can be made to prolong reuseability, the underlying concept of the present invention is explained with the following example to coldwork a nominal 0.2500 inch diameter hole using a tubular seamless SMA sleeve. All dimensions below are in the unit of inches. This example uses a typical coldworking interference level of 0.011 inch in diameter, which is 4.4% of the hole diameter.

| | |
|---|---|
| Pre-coldwork hole diameter: | 0.2430 |
| Selected coldworking interference level: | 0.0110 |
| Expanded hole diameter with sleeve and mandrel in the hole: | 0.2430 + 0.0110 = 0.2540 |
| Selected wall thickness of sleeve: | 0.0100 |
| Mandrel major diameter: | 0.2540 − (2 × 0.010) = 0.2340 |
| Selected sleeve outside diameter, which is preferably smaller than pre-coldwork hole diameter: | 0.2400 (<0.2430) |
| Sleeve inside diameter: | 0.2400 − (2 × 0.010) = 0.2200 |

While the seamless sleeve and mandrel are in the hole during the coldworking operation, the sleeve inside diameter, 0.2200, is expanded by the mandrel to the same size as the mandrel diameter, 0.2340. The approximate hoop strain of the sleeve is calculated below:

$$\frac{0.2340 - 0.2200}{0.2200} = \frac{0.0140}{0.2200} = 6.4\%$$

This 6.4% of hoop strain is substantially larger than the yield strain of most materials except the SMA. To ease the removal of the seamless sleeve out of a hole after coldworking, the strain of 6.4% must be smaller than the critical recoverable strain of a SMA so that the sleeve outside diameter can restore, via the superelasticity property of a SMA, to a size which is smaller than the plastically expanded hole diameter after coldworking. The critical recoverable strain is a characteristic and is specific to each SMA. For the nickel-titanium (Nitinol) familiy of SMA, this critical strain is approximately 7% to 10%. Except for the SMA, the recoverable strain of most metallic materials is smaller than 1.0% which is well below the current practice of coldworking interference levels of about 4%. This is the reason why the sleeve in the prior art of seamless sleeve method described in U.S. Pat. No. 4,164,807 is difficult to remove from the expanded holes after coldworking. This invention and my previous inventions of U.S. Pat. Nos. 5,943,898 and 6,266,991 B1 utilize the tubular seamless SMA sleeve to overcome this difficulty. The superelasticity property of SMA is repeatable. The present invention utilizes such a repeatable property to make the seamless SMA sleeve reuseable and amicable to manufacturing automation. However, the critical recoverable strain can become smaller when the superelasticity property is repeated for some number of times. Thus, said sleeve may not shrink to its original diameter due to the repeated application of the same piece of said sleeve. But, as long as said sleeve can shrink to a size smaller than the diameter of a coldworked hole, said sleeve still can be easily removed out of the coldworked hole; and as long as said sleeve can shrink to a size smaller than the diameter of a pre-coldworked hole, said sleeve can be easily inserted into said pre-coldworked hole. Therefore, said sleeve is reusable. Furthermore, even though the size of said sleeve is slightly larger than the pre-coldworked hole diameter, said sleeve can be gently squeezed into said hole with gentle force owing to the superelasticity property of SMA; and even though said sleeve may not shrink to a size smaller than the diameter of coldworked hole, said sleeve can be pulled out of coldworked hole with gentle force owing to the superelasticity property of SMA. This phenomenon increases the reusability of said sleeve. It was stated in the specification of my previous invention of U.S. Pat. No. 5,943,898 that the seamless SMA sleeve restores to its "original" size after coldworking; and in the specification of my previous invention of U.S. Pat. No. 6,266,991 B1 that the seamless SMA sleeve shrinks to a size smaller than the coldworked hole after coldworking. It is clear from the above discussion that these statements are no longer necessary for the reusability of said seamless SMA sleeve in the present invention.

Considerable axial force is required to pull the coldworking mandrel out of the hole in a workpiece to expand said hole, thereby imparting beneficial residual stress at the edge of said hole to enhance the fatigue life. This axial force is often large enough to cause damage or collapse of the thin-walled sleeves, including seamless SMA sleeves. Any means to reduce said axial force will reduce the propensity to cause damage or collapse of thin-walled sleeves. In this invention, the mandrel is made rotating while it is pulled axially out of the hole in a workpiece. A means is provided to restrain said sleeve from rotating together with said rotating mandrel. The rotating motion of said mandrel is conductive to decreasing the friction at the contact surface between said mandrel and said sleeve, thereby reducing said axial force; and is conductive to ease the axial motion which encounters a resistance due to the nature of metal flow in the workpiece during coldworking operation, thereby reducing said axial force. All of the prior art methods of hole coldworking using a mandrel do not make the mandrel rotate while retracting. The rotating mandrel is also applicable to the split sleeve method described in U.S. Pat. No. 3,566,662, and split mandrel method described U.S. Pat. No. 4,665,732. The rotating mandrel is especially useful to reduce the propensity of creating ridges and shear discontinuities in the split mandrel coldworking method.

Another means to prevent the damage or collapse of thin-walled sleeves is provided in the present invention by strengthening the sleeve itself. In all of the prior art methods, the entire tubular section of the sleeves is of the same thickness. In the present invention, the portion of the tubular section of a sleeve which is not in contact with the hole wall of a workpiece, and which is enclosed within the sleeve-holding means, is made thicker.

This invention further improves the design of the seamless sleeve. To ease the entrance of the mandrel into the sleeve, the diameter of the opening at the flanged end of the sleeve is made larger than the inside diameter of the tubular portion of the sleeve. To ease the insertion of the sleeve into the hole to be coldworked, the outside diameter of a small portion of the tubular section in the unflanged end of the sleeve is made smaller than the rest of the tubular section of the sleeve. Said portion of smaller outside diameter is neither in contact with the hole in a workpiece nor enclosed within the sleeve-holding means.

Yet another improvement is to provide a design feature on the seamless sleeve and a design feature on the sleeve holding means, which is complementary to the design features on said sleeve, to restrain the rotational motion of said sleeve.

One embodiment of the present invention is described hereinafter to illustrate the essential characteristics of the present invention.

In FIG. 1, a portion of the cylinder of a mandrel pulling means 4 having a mandrel 1 is coaxially lined up with a workpiece 34 having a hole 35. Placed between the workpiece 34 and the cylinder of a mandrel pulling means 4 are an extension-tube 6, an adapter 10, a spacer 15, a pre-lubricated tubular seamless SMA sleeve 19, and an end-cap 28 to serve as sleeve holding means. The cylinder of a mandrel pulling means 4 has a screw-threaded front end 5. The mandrel 1 has a major diameter portion 3 and a minor diameter portion 2. The extension-tube 6, serving the purpose to reach holes to be coldworked, has a screw-threaded front end 8, a screw-threaded rear end 7, and a central circular passageway 9. The adapter 10 has a screw-threaded front end 12, a screw-threaded rear end 11, a counter-bore 13 at the front end to seat the spacer 15, and a central circular passageway 14. The spacer 15 has a circular central passageway 18, has a rear portion 16 seating in the counter bore 13 of said adapter 10, has a front portion 17 which is in contact with the flange 20 of the SMA sleeve 19, thereby restraining the axial motion of said sleeve 19. The tubular seamless SMA sleeve 19 is made of shape memory alloys having a superelasticity property, does not have a seam or slot in the tubular portion, and comprises a flange 20, a tubular portion 22 & 24, a fillet radius 26 joining the flange 20 and tubular portion 22, two semi-circular notches 21 located at diametrically opposite sides of the flange, and a central circular passageway 27. When assembled, the tubular portion 22 of said sleeve 19 is enclosed within end-cap 28, is not in contact with the workpiece 34 during coldworking operation, is prone to being collapsed and damaged during coldworking operation, and therefore is made thicker than the tubular portion 24 which is in contact with said workpiece 34. To ease the entrance of the major diameter portion 3 of said mandrel 1 during coldworking operation, the diameter of the entrance opening 23 at the flange 20 of said sleeve 19 is made larger than the inside diameter of the tubular portion 22 & 24. The outside diameter of the forward end of the tubular portion 25 of said sleeve 19 is made slightly smaller than the rest of the tubular portion to ease the insertion of said sleeve 19 into the hole 35 of said workpiece 34. The required recoverable elastic strain for a SMA is determined by the desired coldworking interference level as explained hereinbefore. Any SMA that has a critical recoverable elastic strain in excess of the required value can be used to make the seamless sleeve of the present invention. The Nitinol and Cu—Zn families of SMA possess such a superelastic property. Currently, the Nitinol family of shape memory alloys is a preferred material because these shape memory alloys have a sufficient critical recoverable strain and are technologically well-developed. When technology advances in the future, new families of shape memory alloys may be available for making the seamless sleeve of this invention. The end-cap 28 has a screw-threaded rear end 29, a counter-bore 30 for said sleeve 19 to seat on, a central circular passageway 31, a fillet radius 32 joining said central circular passageway 31 and said counter-bore 30. Said counter-bore 30 has two protruding cylindrical surfaces 33 located at two diametrically opposite sides, which match the two semi-circular notches 21 on said sleeve 19, thereby restraining said sleeve 19 from rotational motion.

The aforementioned coldworking apparatus of the present invention has several improvements when comparing with my previous invention of U.S. Pat. Nos. 5,943,898 and 6,266,991 B1. The design of the SMA sleeve 19 is improved to prolong its useful life. In lieu of the uniform thickness of the tubular portion of the sleeve in the aforementioned previous inventions of mine, a portion of the tubular portion 22 which is not in contact with the workpiece 34 is made thicker for strengthening, the outside diameter of the forward end 25 of the tubular portion 24 is made smaller to ease the insertion of said sleeve 19 into the hole 35 in said workpiece 34, the opening 23 in the flange 20 is made larger than the inside diameter of the tubular portion 22 & 24 to ease the entrance of the major diameter 3 of the mandrel 1, two semi-circular notches 21 in the flange 20 are provided to restrain the circular motion of said sleeve 19 due to the rotating mandrel during coldworking operation. Such circular motion is prone to causing damage to said sleeve 19. Another improvement is that to restrain the circular motion of said sleeve 19, the counter-bore 30 in the end-cap 28 is provided with two protruding semi-cylindrical surfaces to match with the two semi-circular notches 21 in said sleeve 19.

Figure 2:
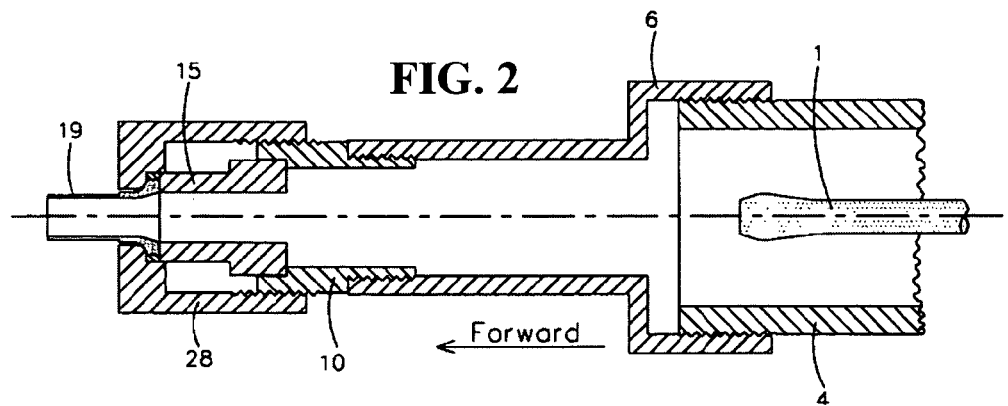
FIG. 2 is a cross sectional view of the parts of the present invention, which are assembled together with a portion of a mandrel pulling means.

A preferred coldworking operation utilizing a rotating mandrel is comprised of the following five steps. The first step of coldworking operation, illustrated in FIG. 2, is to assemble coaxially the mandrel 1, the cylinder of a mandrel pulling means 4, extension-tube 6, adapter 10, spacer 15, pre-lubricated tubular seamless SMA sleeve 19, and end-cap 28.

Figure 3:
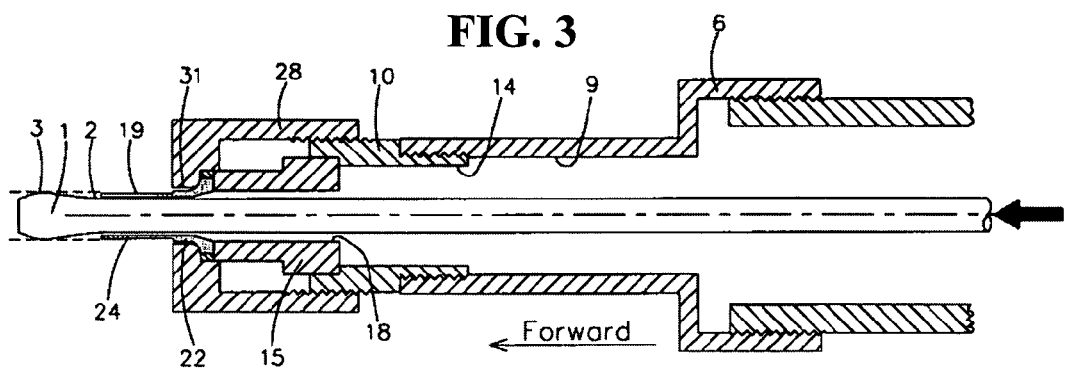
FIG. 3 is a cross sectional view to show that the diameter of a tubular seamless SMA sleeve shrinks to a size smaller than the major diameter of a mandrel after the major diameter portion of a mandrel passing forward through and out of said sleeve.

The second step of coldworking operation, illustrated in FIG. 3, is to push the major diameter portion 3 of the mandrel 1 through the central circular passageway 9 of the extension-tube 6, circular central passageway 14 of the adapter 10, central circular passageway 18 of the spacer 15, and the tubular portion 22 & 24 of the seamless SMA sleeve 19, and to position the mandrel 1 at a location such that the minor diameter portion 2 of the mandrel 1 is adequately inside of said sleeve 19. Because the major mandrel diameter 3 is larger than the inside diameter of said sleeve 19, an axial force is applied to said sleeve 19 while the major diameter portion 3 of the mandrel 1 passes through said sleeve 19. The lubricant provided on the inside surface of the tubular portion 22 & 24 of said sleeve 19 decreases the friction between said mandrel 1 and sleeve 19, thereby reducing the required axial force. The diameter of the central circular passageway 31 of the end-cap 28 is sufficiently large so that the outside surface of said sleeve 19 will not interfere with the end-cap 28 while the mandrel 1 passes forward through said sleeve 19. While the major diameter portion 3 of the mandrel 1 passes through said sleeve 19, it exerts a radial force on and thereby expands the diameter of said sleeve 19. After the major diameter portion 3 of the mandrel 1 passes forward through and out of said sleeve 19, the outside diameter of said sleeve 19 shrinks owing to the superelasticity property of the shape memory alloys. The size of the outside diameter of said sleeve 19 after shrinking depends on the coldworking interference level and the number of times the sleeve is used; it may not be smaller than the diameter of the hole 35 in the workpiece 34 and it need not be so for the third step of coldworking operation.

Figure 4:
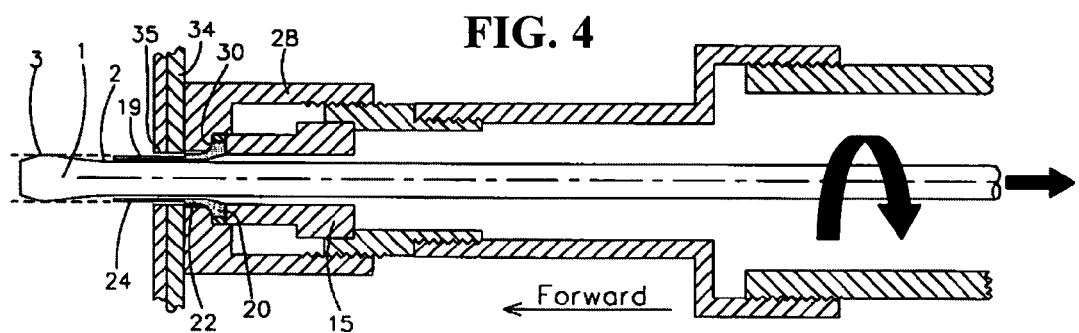
FIG. 4 is a cross sectional view that shows the insertion of a tubular seamless SMA sleeve and a mandrel into the hole of an associated workpiece, the diameters of said hole, said sleeve, and said mandrel, and the directions of the axial and rotational motion of the mandrel during retraction operation.

The third step of coldworking operation, illustrated in FIG. 4, is to insert the mandrel 1 and the seamless SMA sleeve 19 into the hole 35 in the workpiece 34, and position the forward end of end-cap 28 against the workpiece 34. In case the shrunken outside diameter of said sleeve 19 after the second step of coldworking operation is larger than the diameter of the hole 35 in the workpiece 34, said sleeve 19 still can be inserted into said hole 35 with gentle force owing to the superelasticity property of the shape memory alloys. The position of the hole 35 in the workpiece 34 is coincident with the small diameter portion 2 of the mandrel 1 surrounded by said sleeve 19.

The fourth step of coldworking operation, also illustrated in FIG. 4, is to retract the mandrel 1 backward axially while rotating the mandrel simultaneously; in doing so, the major diameter portion 3 of the mandrel 1 exerts a radial force on the tubular portion 24 of the seamless SMA sleeve 19 because the diameter of the major diameter portion 3 of the mandrel 1 is larger than the inside diameter of the tubular portion 24 of said sleeve 19 which is constrained from free expansion by the hole 35 in the workpiece 34. The movement of the tubular portion 22 & 24 of said sleeve 19 in the axial or circulatory direction is insignificant because the flange 20 of said sleeve 19 is firmly restrained between the spacer 15 and the counter-bore 30 of the end-cap 28 in both axial and circumferential direction, and because the lubricant on the inside surface of the tubular portion 22 & 24 of said sleeve 19 decreases the friction between the mandrel 1 and said sleeve 19. The diameter of the tubular portion 22 &24 of said sleeve 19 expands beyond the diameter of the hole 35 in the workpiece 34; therefore the material of the hole 35 is compressed by the tubular portion 24 of said sleeve 19 and the hole diameter expands beyond its yield strength. Thus, a compressive residual stress is created around the hole 35 to improve fatigue life.

Figure 5:
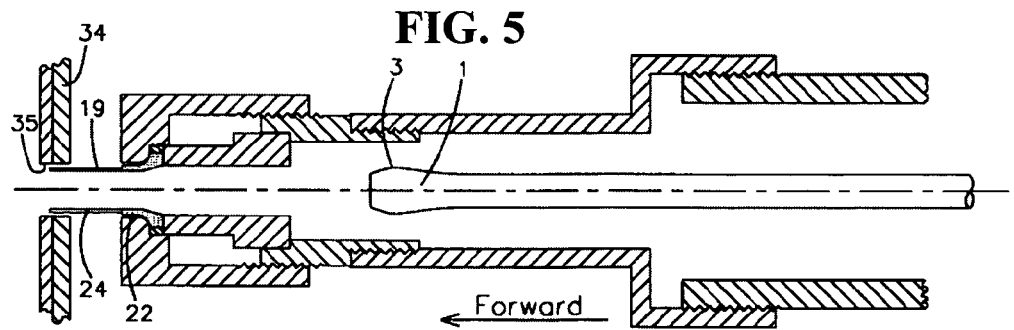
FIG. 5 is a cross sectional view which shows the position of the mandrel after retracting backward, the diameter of the hole in an associated workpiece being enlarged, and the diameter of the tubular seamless SMA sleeve shrinking to a size smaller than the diameter of the coldworked hole.

The fifth and final step of coldworking operation, illustrated in FIG. 5, is to remove the seamless SMA sleeve 19 together with the mandrel 1 and the assembly of the mandrel pulling means out of the coldworked hole 35 in the workpiece 34. After the major diameter portion 3 of the mandrel 1 retracts backward through and out of the tubular portion 22 & 24 of said sleeve 19, the diameter of said sleeve 19 shrinks because of the superelasticity property of SMA. If the shrunken outside diameter of said sleeve 19 is slightly larger than the diameter of the coldworked hole 35, said sleeve 19 can be pulled out of the coldworked hole 35 with gentle force together with the mandrel pulling means.

To coldwork additional holes of the same size, repeat the aforesaid steps 3 through 5 inclusive. The same seamless SMA sleeve is reuseable owing to the repeatability of the superelasticity property of SMA. There is no need to de-assemble the apparatus and change the sleeve. Such a feature makes the present invention amicable to manufacturing automation. The assembly of the apparatus shown in FIG. 2 can be installed in an automatic hole drilling system which drills a pilot hole, reams the pilot hole to a pre-coldworked hole size, and coldworks the hole. No reaming is required after coldworking.

The present invention and its attendant advantages are indicated by the foregoing description. It will be apparent that the form, construction, and arrangements of the tubular seamless sleeve made of shape memory alloys and the associated parts of the invention can be varied without changing the concept of the invention, that the specific embodiment of the invention described hereinbefore is considered in all respects as illustrative and not restrictive, and furthermore that variation may be made without departing from the scope of the invention as defined in the accompanying claims.

I claim:

1. An apparatus for coldworking holes in a workpiece comprising:
    a seamless sleeve comprised of a shape memory alloy having a superelasticity property, wherein the sleeve includes a tubular portion configured to be received by the hole, and a flange portion attached to the tubular portion, the flange portion including first interlocking portions;
    a cylindrical-shaped mandrel that is configured to be rotated while axially moved within the sleeve, the mandrel having a major diameter portion and a minor diameter portion, wherein the major diameter radially expands the sleeve while moved within the sleeve during the coldworking operation; and
    an end-cap configured to receive the sleeve and including second interlocking portions that receive the first interlocking portions to prevent rotational movement of the sleeve relative to the end cap.

2. The apparatus for coldworking holes as claimed in claim 1 wherein the flange of said sleeve is received in a recess in the end cap that restrains the axial and rotational motion of said sleeve.

3. The apparatus for coldworking holes in claim 2 wherein the flange includes two notches on opposing sides of said flange that engage corresponding protrusions in the recess.

4. The apparatus for coldworking holes in claim 2 wherein the recess includes two protrusions on opposing sides of the recess that engage corresponding notches in the flange.

5. The apparatus for coldworking holes as claimed in claim 4 wherein the two protrusions include semi-cylindrical protruding surfaces located at diametrically opposite sides of the wall of said counter-bore and wherein the notches include two semi-circular notches.

6. The apparatus for coldworking holes as claimed in claim 1 wherein a section of the tubular portion of said sleeve adjacent the flange and not in contact with a hole to be coldworked and enclosed within said end-cap is made thicker than other portions of the sleeve to strengthen said sleeve.

7. The apparatus for coldworking holes as claimed in claim 1 wherein a section of the tubular portion of the sleeve opposite the flange includes an outside diameter that is smaller than other portions of the sleeve in order to ease the insertion of said sleeve into said hole.

8. An apparatus for coldworking a workpiece, comprising:
a continuous sleeve tat is removably positionable in an aperture formed in the workpiece, wherein the sleeve includes first interlocking portions;
an end cap that is configured to receive the continuous sleeve, wherein the end cap includes second interlocking portions that receive the first interlocking portions to maintain the sleeve stationary with respect to the end cap; and
a rotating mandrel configured to be inserted into the sleeve while rotating to radially expand the sleeve while positioned within the aperture to cold work at least a portion of the workpiece proximate to the aperture.

9. The apparatus of claim 8 wherein the sleeve is comprised of a shape memory alloy having a superelasticity property.

10. The apparatus of claim 9 wherein the shape memory alloy further comprises one of a copper-zinc (Cu—Zn) alloy and a nickel-titanium (Ni—Ti) alloy.

11. The apparatus of claim 8, wherein the workpiece is comprised of an aluminum alloy.

12. A method of coldworking a workpiece, comprising:
positioning a continuous sleeve having a first diameter into an aperture formed in the workpiece, wherein the sleeve includes first interlocking portions;
providing an end cap that is configured to receive the continuous sleeve, wherein the end cap includes second interlocking portions that receive the first interlocking portions to maintain the sleeve stationary with respect to the end cap;
introducing a mandrel having a second diameter that is larger than the first diameter into the sleeve while the sleeve is positioned within the aperture; and
rotating the mandrel while radially expanding the continuous sleeve to cold work at least a portion of the workpiece proximate to the aperture.

13. The method of claim 12, further comprising rotating the mandrel while the mandrel is removed from the continuous sleeve.

14. The method of claim 12, wherein positioning a continuous sleeve having a first diameter into an aperture comprises positioning a continuous sleeve having a superelasticity property into the aperture.

15. The method of claim 14, wherein positioning a continuous sleeve having a superelasticity property into the aperture comprises positioning a continuous sleeve comprised of one of a copper-zinc (Cu—Zn) alloy and a nickel-titanium (Ni—Ti) alloy into the aperture.

* * * * *